United States Patent [19]
Harmand et al.

[11] Patent Number: 5,829,928
[45] Date of Patent: *Nov. 3, 1998

[54] APPARATUS AND METHOD FOR MACHINING VALVE SEATS IN AN ENGINE CYLINDER HEAD

[75] Inventors: Brice Harmand, San Diego, Calif.; Pierre Harmand, Annecy, France

[73] Assignee: Harmand Family Limited Partnership, San Diego, Calif.

[ * ] Notice: The term of this patent shall not extend beyond the expiration date of Pat. No. 5,613,809.

[21] Appl. No.: 711,282

[22] Filed: Sep. 9, 1996

Related U.S. Application Data

[63] Continuation-in-part of Ser. No. 490,468, Jun. 14, 1995, Pat. No. 5,613,809.

[51] Int. Cl.$^6$ .......................... B23B 41/00; B23B 47/26; B24B 15/02
[52] U.S. Cl. .......................... 408/83.5; 408/234; 408/89; 408/91; 408/109; 451/430
[58] Field of Search ................................ 408/1 R, 78–82, 408/83.5, 234–237, 89, 91, 109, 709; 269/25

[56] References Cited

FOREIGN PATENT DOCUMENTS 0300959  6/1988  European Pat. Off. .
9204152  3/1992  WIPO .

Primary Examiner—Steven C. Bishop
Attorney, Agent, or Firm—Brown, Martin, Haller & McClain

[57] ABSTRACT

The valve seat and guide machine comprises a base structure which supports a pantograph having a major arm and minor arm which moves slidably with respect to the major arm. A spherical head is supported by a number of sphere seats attached to the pantograph arm so that the spherical head can pivot around its centerpoint. A stepper motor provides small z-axis translation of the spindle which is contained in the spherical head and has a cutting bit and a pilot which extend from the bottom of the spherical head. A drive motor rotates a transmission linkage which is coupled to the spindle which rotates the cutting bit to cut the valve seat. Small x,y displacements are enabled by moving the entire spherical housing and its supporting sphere seats with respect to the support frame. The pantograph provides large z-axis displacement to remove the spindle from the cutting position and to provide clearance for movement to another machine site. A system controller receives feedback from system monitors to control the spindle rotation and translation. Such information can be stored on a removable memory card for repeatable machining. The cylinder head is held in place by a pair of supports which allow the rotation of the cylinder head for easy positioning of the valve guides in the plane of the spherical head and spindle. These supports are moveable from side-to-side to allow the cylinder head to be moved so that successive valve seats may be machined.

49 Claims, 9 Drawing Sheets

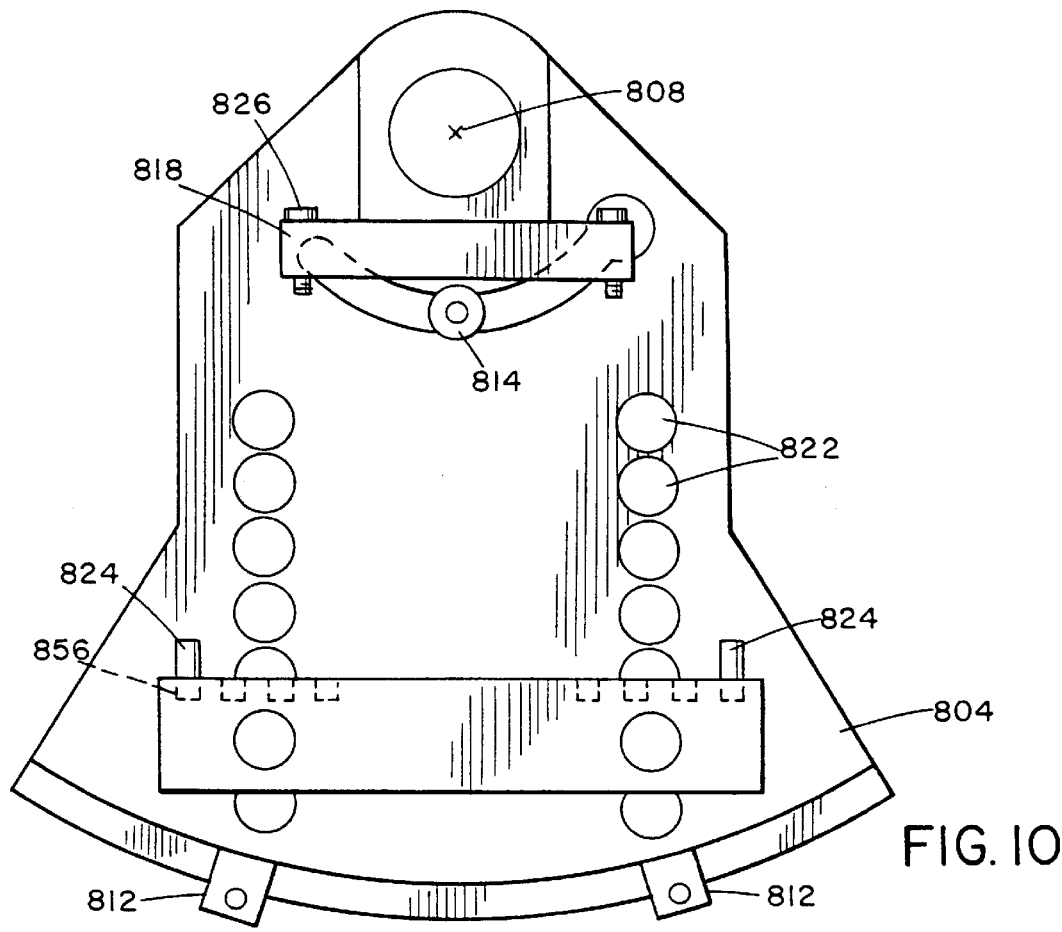
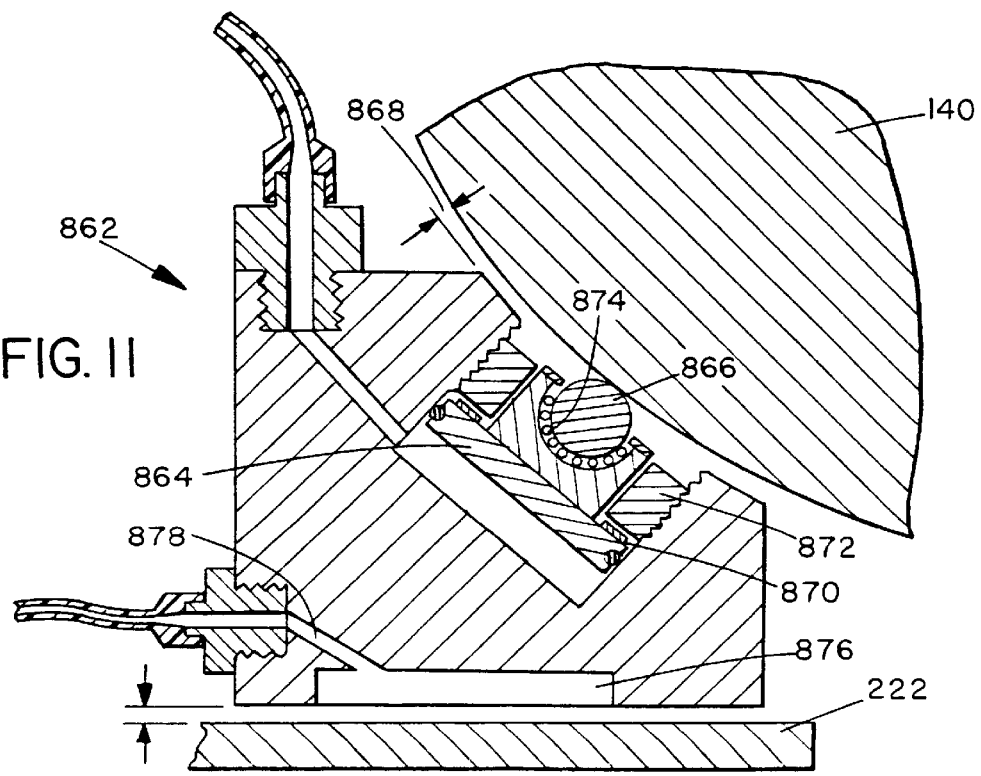

APPARATUS AND METHOD FOR MACHINING VALVE SEATS IN AN ENGINE CYLINDER HEAD

This is a continuation-in-part of application Ser. No. 08/490,468, filed Jun. 14, 1995, now issued as U.S. Pat. No. 5,613,809.

BACKGROUND OF THE INVENTION

In internal combustion engines, it is essential that the cylinders be completely airtight when the valves are closed to assure efficient fuel consumption and transfer of power. This airtightness is achieved, among other things, by assuring that the valve heads perfectly match the valve seats. Since contact surfaces of the valves and valve seats are subject to wear and other degrading factors that affect the contact surface textures, these surfaces must be modified to re-establish the high quality seal.

It is well known among vehicle mechanics, especially that valve seats can be machined to remove the outer surface of the seat to expose a smooth and uniform contact surface. This machining is accomplished by removing the engine cylinder head and inverting it on a work surface to provide access to the valve seats. A cutting blade is positioned to cut at the desired radius and a pilot which is concentric with the center of rotation of the cutting blade is inserted into the valve guide to center the cutting edge. A spindle attached to a drive motor rotates the blade and pilot to remove the outer layer of the contact surface of the valve seat.

While this procedure would be easy to set up and would provide consistent results if all valve guides were oriented in the same direction, cylinder heads have a wide range of valve guide orientation (angular displacement) within a single head, with two or four valves per cylinder. Thus, it is necessary to provide capability to move both the tool position along the length and width of the cylinder head and the valve guide orientation. In order to achieve this, it is necessary to provide precision movement of a large, heavy piece of equipment.

Probably the best known system providing adjustability of the machining head is that it is manufactured and sold by Serdi, a portion of which is disclosed and claimed in U.S. Pat. No. 4,365,917, issued Dec. 28, 1982, of Pierre Harmand, one of the co-inventors of the present invention. This work-holding device utilizes a machine head with a spherical guide within a spherical guide seat conforming to the sphere. The machine head is mounted on a base and a horizontal plane is provided by moving the system's base along an air cushion. The air cushion provides virtually frictionless motion. Air cushions are also created between the sphere and the sphere seat to allow the machine components (motor, spindle, etc.) to be displaced about the sphere's centroid, changing the angular orientation of the spindle. A closely-tolerenced pilot (within 1/100 mm of the valve guide inner diameter) is introduced into a valve guide and machine head self-centers with the sphere moving freely within the guide seat. A locking system locks the sphere in place once it is properly aligned. After machining the valve seat, the sphere is unlocked and the pilot is extracted. The spindle is returned to a vertical starting position and the process is repeated for each valve seat of the cylinder head.

A disadvantage of the above system is that the entire machine head is lifted and supported by the air cushion to center the spindle. Since the head moves freely at this point, the significant weight of the head, approximately 440 lbs. (200 kg), develops considerable kinetic energy which must be controlled to insert the pilot into the valve guide, and the pilot must be able to absorb the kinetic energy of the head to hold its movement until all oscillation has ceased and any flexion of the pilot has stopped. In short, the pilot acts as a spring and realigns/centers the machine head until all lateral forces dissipate.

A second prior art embodiment of a valve seat and guide machine provides horizontal travel by way of a movable stage onto which the cylinder head is clamped. The spindle still moves within a spherical housing to provide angular control, however, lateral adjustment is enabled by the stage which is separated by the base of the fixed head system by an air cushion. While this system may have an advantage in that the weight of the machine head does not need to be moved, the combined weight of the moveable stage and the cylinder head is over 330 lbs (150 kg) which means the considerable momentum is generated when the stage is moved. Further, this system has the disadvantage that the head height is fixed relative to the work surface, such that z-axis adjustability can only be attained by modifying the spindle length. Using slides, this can result in frequent spindle modifications and may impact centering and rotational stability due to variable lengths and rigidity of the spindle and the fact that spindles are typically driven from the end farthest from the cutting tip.

Prior art valve seat machining systems have displayed further problems when repeatably cutting valve seats with a three-angle cutter. In this procedure, a large surface is typically being cut, making control especially crucial. Particularly, the machinist must keep the cutter from rubbing the metal once the cut is completed, i.e., when the spindle feed is completed. It is established that the best cut is obtained when the spindle rotates one to three turns without cutting at the end of the cut, in a "polishing" type of process. If the operator fails to bring the spindle back up, since the cutter is still in contact with the valve seat, it will vibrate or chatter, possibly damaging the valve seat and/or the cutting bit. In order to achieve the ideal one to three additional turns to assure that the valve seat is round but still avoid vibration or chatter, the user must be quick at raising the spindle, since at speeds of several hundred revolutions per minute, the desired few additional turns occur within fractions of a second. This makes control and repeatability a significant problem.

In view of the aforementioned inadequacies of the prior art, the need exists for a valve seat and guide machine that can readily compensate for the height difference within and between cylinder heads and which can be easily controlled in its lateral movement to provide rapid and accurate repositioning without undue strain on the pilot or spindle.

SUMMARY OF THE INVENTION

It is an advantage of the present invention to provide independent means for coarse and fine adjustment of lateral movement in a valve seat and guide machine for machining engine cylinder heads.

It is another advantage of the present invention to provide a machine for machining valve seats in an engine cylinder head that has a relatively lightweight head which can easily be controlled during lateral, vertical and angular movement without overcoming substantial momentum due to the weight of the machine head.

Yet another advantage of the present invention is to provide a precision machine for providing measurement of valve seat depth to be cut to assure uniformity in valve seat depth across a cylinder head.

Still another advantage of the present invention is to provide a precision machine for machining valve seats which can store the machining information on a removable memory card.

It is another advantage of the present invention to provide a precision machine which holds the cylinder head in a manner which allows the head to be positioned for optimum machining.

In an exemplary embodiment the inventive valve seat and guide machine comprises a base structure on which is pivotally supported a pantograph having a major arm on which is mounted a drive motor and minor arm which moves slidably with respect to the major arm. Pivotally attached to each arm of the pantograph is a head portion with a support frame which retains a spherical head and a plurality of sphere seats for supporting the spherical head so that it can pivot around its centerpoint at the center of the sphere. A stepper motor is disposed at the top of the spherical head and a spindle and pilot extend from the bottom of the spherical head. The stepper motor is attached to a screw drive which in turn is attached to the spindle structure to provide spindle movement along the z-axis (up and down). Small z-axis displacement and spindle feed/retraction along the z-(vertical) axis is provided by the stepper motor. Spindle height is determined by a linear gauge which measures distance to the surface of the cylinder head into which the valve seat is to be cut in order to determine how deep the valve seat should be cut. The electrical signal from the linear gauge is provided to a computer control for the stepper motor which raises or lowers the height of the spindle to achieve a predetermined valve seat depth. The drive motor rotates a transmission linkage which in turn rotates the spindle using cone-shaped pinions to cause a cutting bit, typically carbide, mounted on the spindle to cut the valve seat. The transmission linkage enters through the side of the spherical housing to directly engage the spindle within the housing, allowing the use of a relatively short, lightweight spindle assembly.

Telescoping drive axle joints and universal joints in the transmission linkage connect the drive motor to the pinions so that when the spindle is moved along any axis and/or the sphere is rotated, connection is maintained for applying the drive force.

The base on which the pantograph is mounted includes means for lateral movement in the x,y plane, preferably by way of an air cushion or other friction, to provide large x,y displacement to move from one machine site on the cylinder head to another. Alternatively, the base can be fixed an large x,y displacement can be provided by using an x,y stage for supporting the cylinder head. Both alternatives are within the prior art.

Small x,y displacements are enabled by moving the entire spherical housing and its supporting sphere seats with respect to the support frame. This movement is facilitated by air cushions between the seats and support frame. Once adjustment is completed, the air cushions are disabled, and the spherical housing is locked in place. After machining a valve seat, centering pistons are activated to return the spindle to a zero position.

The pantograph swings up and down on the base to provide large z-axis displacement to remove the spindle from the cutting position, to provide clearance for movement to another machine site, and to compensate for height variations between and within cylinder heads. After attaining the desired large z-axis adjustment, locking pistons are extended to hold the pantograph in position.

A system controller includes a microprocessor which receives feedback from system monitors and gauges and provides signals controlling rotational speed and feed and retraction speed. Memory within the controller includes software for selecting appropriate machining parameters for precise, repeatable machining. In addition, the specific machining characteristics of any one cylinder head may be stored on a removable memory card to provided improved consistency, and the ability to customize the machining characteristics for a particular customer.

In an alterative embodiment, the base which holds the cylinder head consists of two upright supports. These supports are each equipped with a clamping plate which pivots about a rotational axis that is perpendicular to the bore axis. The cylinder head is clamped to between the clamping plates and rotated about the rotational axis to position the valve guides in the vertical plane of the spindle. Once in the vertical plane, the valve seat is cut by lowering the spindle and rotating cutting bit into the head. Because a cylinder head generally has a number of valve guides in a single plane, the upright supports are moveable in the x-direction (left-to-right). This allows the cylinder head to be moved in relation to the spindle, facilitating the machining of multiple valve seats without re-positioning the pantograph.

In addition to the linear gauge, a laser depth gauge may also be used to determine the precise depth of the valve seat. This laser depth gauge provides an electrical output which is used for maintaining consistency between successive valve seats.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to parts, and in which:

FIG. 10 is a detail view of the clamping plate; and

FIG. 11 is a cross-sectional view of the spherical seat showing the piston and supporting ball.

DESCRIPTION OF THE PREFERRED EMBODIMENT

Figure 1:
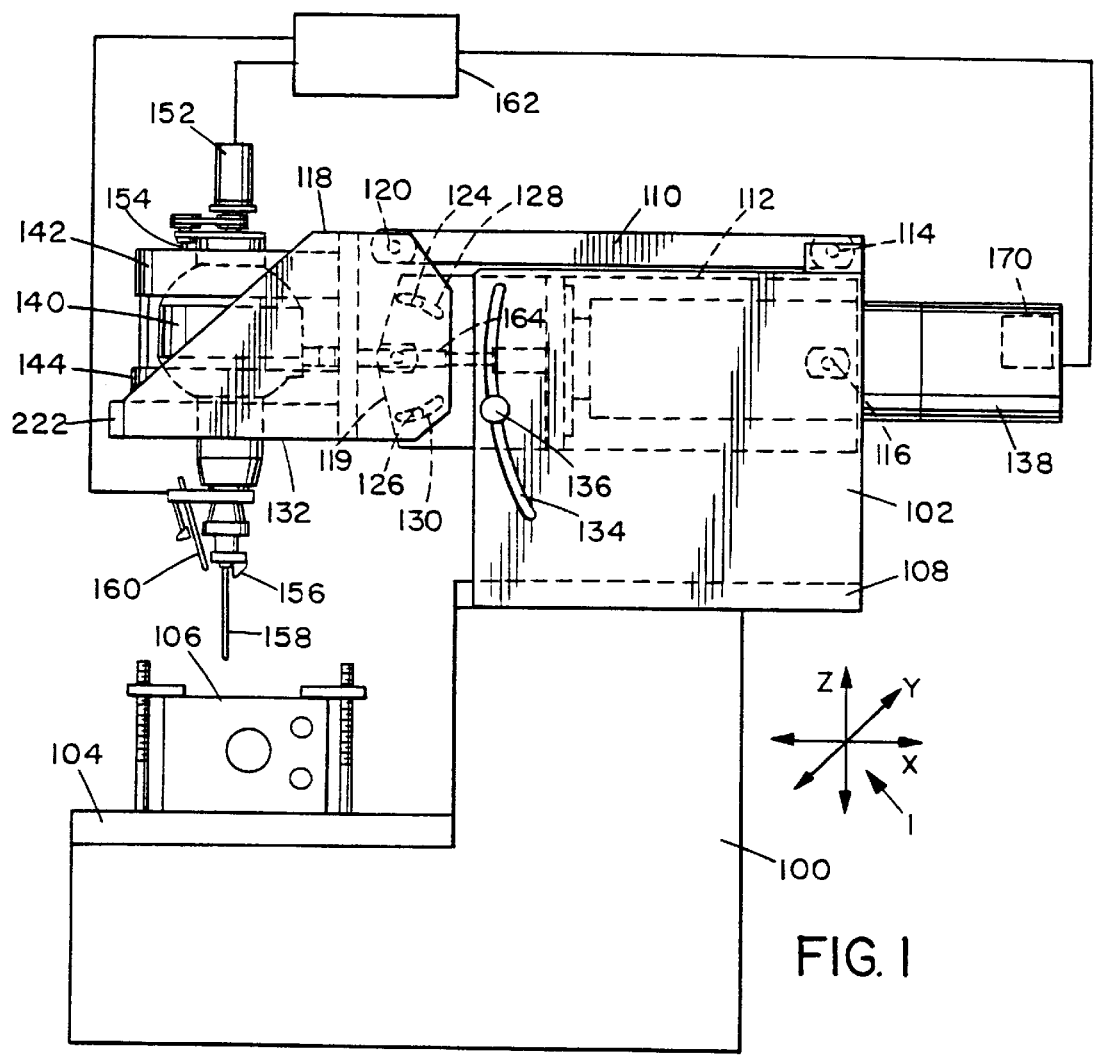
FIG. 1 is a side elevation view of the machine in use.

As illustrated in FIG. 1, the apparatus for machining valve seats has a base 102 mounted on a stand 100 or support means which also supports stage 104 on which an engine cylinder head 106 to be machined is clamped. (Screw-type clamps are illustrated, however, other clamps as are known in the art may be used.) Base 102 is mounted on stand 104 by way of an air cushion platform 108 which provides movement along the x, y plane. The x, y plane 2 and axes 1 are provided to facilitate descriptions of the relative movement of components of the inventive apparatus. Alternatively, an air cushion platform is disposed between stage 104 and stand 100 to allow x, y translation by moving the stage 104.

A pantograph consisting of arms 110 and 112 is pivotally attached to base 102 at pivot points 114 and 116 at the distal end of each arm. The proximal end 120 of arm 110 is pivotally attached to the top of head portion 118. The proximal end 122 of arm 112 is attached via pivot 119 and the combination of lugs 124 and 126 and arcuate channels permits the ends of arm 112 of the pantograph to be moved up or down along the z-axis, pivoting on pivot points 116 while head portion 118 remains in a horizontal orientation, i.e., with the lower edge 132 of head portion 118 remaining parallel to stage 104. The combination of arcuate channel 134 and lug 136 guides the movement of arm 112.

Drive motor 138 is disposed within pantograph arm 112 and in addition to providing the drive means for machining, provides counterbalance to the weight supported by frame 118 to facilitate movement of the pantograph to make large adjustments along the z-axis. A tachometer 170 or other speed measurement device is included in the motor to provide an electrical signal which can be provided to system controller 162 as feedback to adjust operating parameters of the system.

Spherical housing 140 and sphere seats are retained within head portion 118. Sphere seats 144 are mounted air cushions supported by support frame 222 (shown in FIG. 2) to permit a small range of movement in the x, y plane. Sphere seat 142 is attached to and moves with seat 144. Spherical housing is pivotable in all directions about its centroid to permit machining operations on valve seats with angular displacement from the z-axis. Spindle 150 is rotatably and slidably retained within spherical housing 140. Vertical movement of spindle 150 (along the z-axis) is provided by stepper motor 152 mounted on top of spherical housing 140. Stepper motor 152 drives a screw 154 to raise and lower spindle 150 with respect to spherical housing 140 to provide small z-axis adjustment and to provide feed and retraction of the spindle.

Spindle 150 rotates to turn cutting bit 156 and is guided by pilot 158 which fits closely within the valve guide of the engine cylinder head 106. Linear gauge 160 contacts the surface of the cylinder head and produces an electrical signal indicative of surface distance. This signal is provided to a system controller 162, which may be a dedicated microprocessor or a main system computer, which, in turn provides a command to stepper motor 152 to correctly adjust heights of the cutting bit., i.e., spindle height, to provide repeatable results in machining valve seat depth. Other means for measuring distance may be used, as are known in the art, including optical measurement techniques, e.g., lasers.

The system controller 162 includes memory for retaining programming with operational parameters determined empirically to be optimum for given type of engine, e.g., cylinder head metal, area to be machined, etc. These factors are used to determine revolution speed of the spindle, spindle feed speed, number of revolutions following completion of a cut, etc. With such information in memory, the operator needs only to select the appropriate program settings, center the spindle, then allow the system to control itself. For example, the user enters data into the controller 162, including how much metal is to be removed and the type of metal being machined. Using a look-up table externally or stored within memory, the input information is used to determine rate of removal of metal, i.e., feed per revolution. The number of rotations of the cutter after completion of the cut, for the "polishing" step is entered, or may be included within the stored parameters in memory, since, in most cases, the type of metal and amount of cut will determine the number of rotations for this step. The user simply needs to activate the system after the initial input of information for a given cylinder head, recentering on each subsequent valve seat before activation.

Transmission linkage 164 provides means for transferring the force from drive motor 138 to spindle 150 to rotate the spindle. Linkage 164 enters the spherical housing 140 through the side of the housing closest to the drive motor 138, and directly contacts the spindle within the housing 140. This permits the spindle 150 to be as short and lightweight as possible, thus minimizing flexion and eccentricity. Universal or homokinetic joints 166 and 168 absorb any non-linearity in the linkage when the spherical housing 140 is shifted along any axis or at an angle with respect to drive motor 138. The linkage 164 also has telescoping joints to compensate for length changes due to relative movements between the spherical housing 140 and drive motor 138. Cone-shaped pinions drive the spindle rotation in response to rotation of the axis of drive motor 138. (These features are shown and described in more detail in FIG. 3.)

Figure 2:
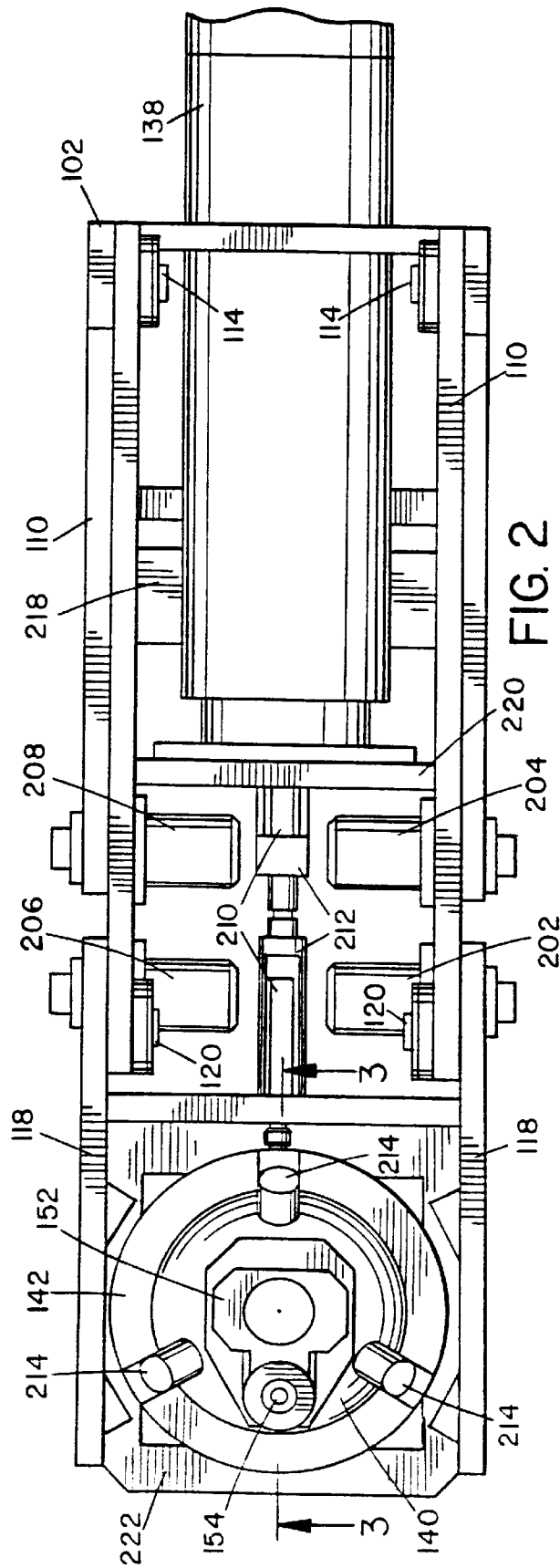
FIG. 2 is an enlarged top plan view of the machine head.

Referring now to FIG. 2, which is a top view of the apparatus, the arms 110 and 112 of the pantograph are disposed symmetrically on both sides of the base support. Arms 110 are joined together at their distal ends by connecting bar 216. Drive motor 138 is mounted between arms 110 and 112 on support 218 and by connecting plate 220.

Transmission linkage 164 which is connected to the drive shaft of motor 138 has telescoping joints consisting of shaft 210 and sleeve 212, which have mating cross-section, e.g., hexagonal, which transfer rotational force from one to the other while allowing shaft 210 to slide axially within sleeve 212 to increase or shorten the effective length of the linkage. Universal or homokinetic joints 166 and 168 permit flexing of the linkage to compensate for relative angular motion between the drive motor 138 and the spherical housing 140 while maintaining the drive rotation.

Locking pistons 202, 204, 206, 208 are attached to pantograph arms 110 and 112 and are operated pneumatically or by other means as are known in the art (e.g., hydraulically, electromechanically or magnetically). Pistons 204 and 208 provide force against the pantograph arms 110 and 112 and the base 102 to prevent movement with respect to each other. Pistons 202 and 206 compress pantograph arms 110 and 112 and head portion 118 to hold the two together. Both sets of pistons are activated when the desired coarse z-axis level has been attained by raising or lowering the pantograph to lock the pantograph in the desired position. Once the machining process is completed, the pistons are deactivated to permit the distal end of the pantograph to be shifted downward to lift the head portion 118 and spindle 140.

In order to assure the smoothest travel when moving the pantograph, it is preferred that bearings be provided between the moving surface at pivot points 114, 116 and 120. The bearings may be either ball, sleeve or other bearings as are known in the art, to minimize friction at the pivot points.

The sphere seats 142 and 144 by which spherical housing 140 is supported and stabilized are mounted on a support frame 222 which includes an air cushion to allow fine adjustment along the x and y axes. The range of movement is limited to approximately 1 cm along the x and y axes.

Once the pilot has been moved to the general area to be machined using the air cushion 108 for large x,y movement, the fine adjustment is made to center the pilot 158 over the valve guide in the cylinder head. In each case air cushions are turned off after the desired positioning is achieved, with the weight of the base 102 and the weight of the combined spindle assembly and sphere seats 142 and 144 effectively locking the spherical housing on the seats, providing stabilization of the positioning. Additional locking of the sphere seat may be provided by pneumatic pistons which are activated when the air cushion is deactivated to compress the lower sphere seat 144 and the support 222 together to prevent relative movement. Other types of pistons as known in the art, including hydraulic, mechanical or electromechanical, may be used Referring now to FIG. 3 which illustrates the details of the spindle head assembly, support frame 222 is fixedly attached to the lower edge of head portion 118. An air cushion (aerostatic bearing) is formed by forcing pressurized air into the spacing between the sphere seat 144 and support frame 222. As illustrated, the air is introduced into sphere seat 144 via air tubing 302 to the left of the sphere seat 144, allowing it to be readily and smoothly shifted within the x, y plane. The range of motion is limited, on the order of 1 cm.

Figure 6:
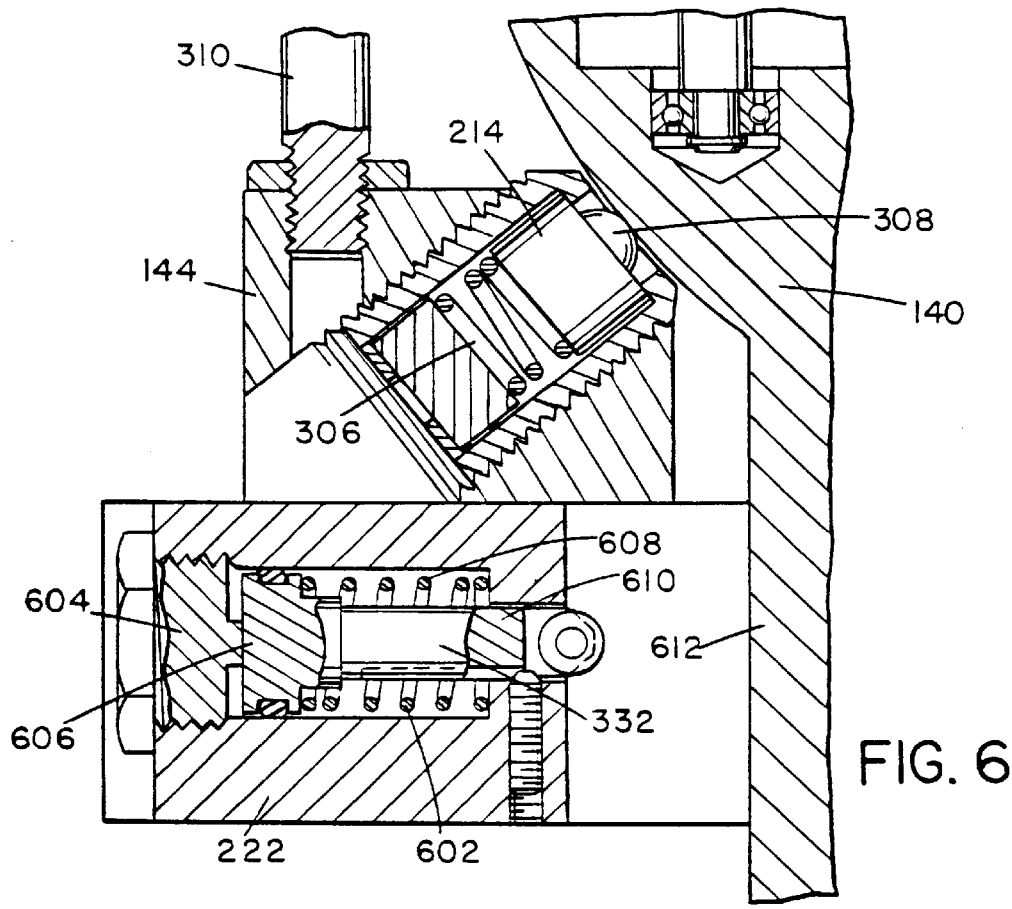
FIG. 6 is an enlarged detail of a portion of FIG. 3.

Coincident with, or separately from the air cushion, sphere seat bearings 214 are activated by applying air pressure via air tubing 302 to compress spring 306 and force the ball bearing 308 outward to contact the outer shell of spherical housing 140. Separate activation of the air bearing between sphere seat 144 and support frame 222 and the sphere seat bearings 214 may be achieved by providing separate air inlets while isolating the bearings from each other. Further details of sphere seat bearings 214 is illustrated in FIG. 6. There are preferably three sphere seat bearings 214 associated with each sphere seat, spaced at uniform spacings around the seats, although more may be used.

Figure 3:
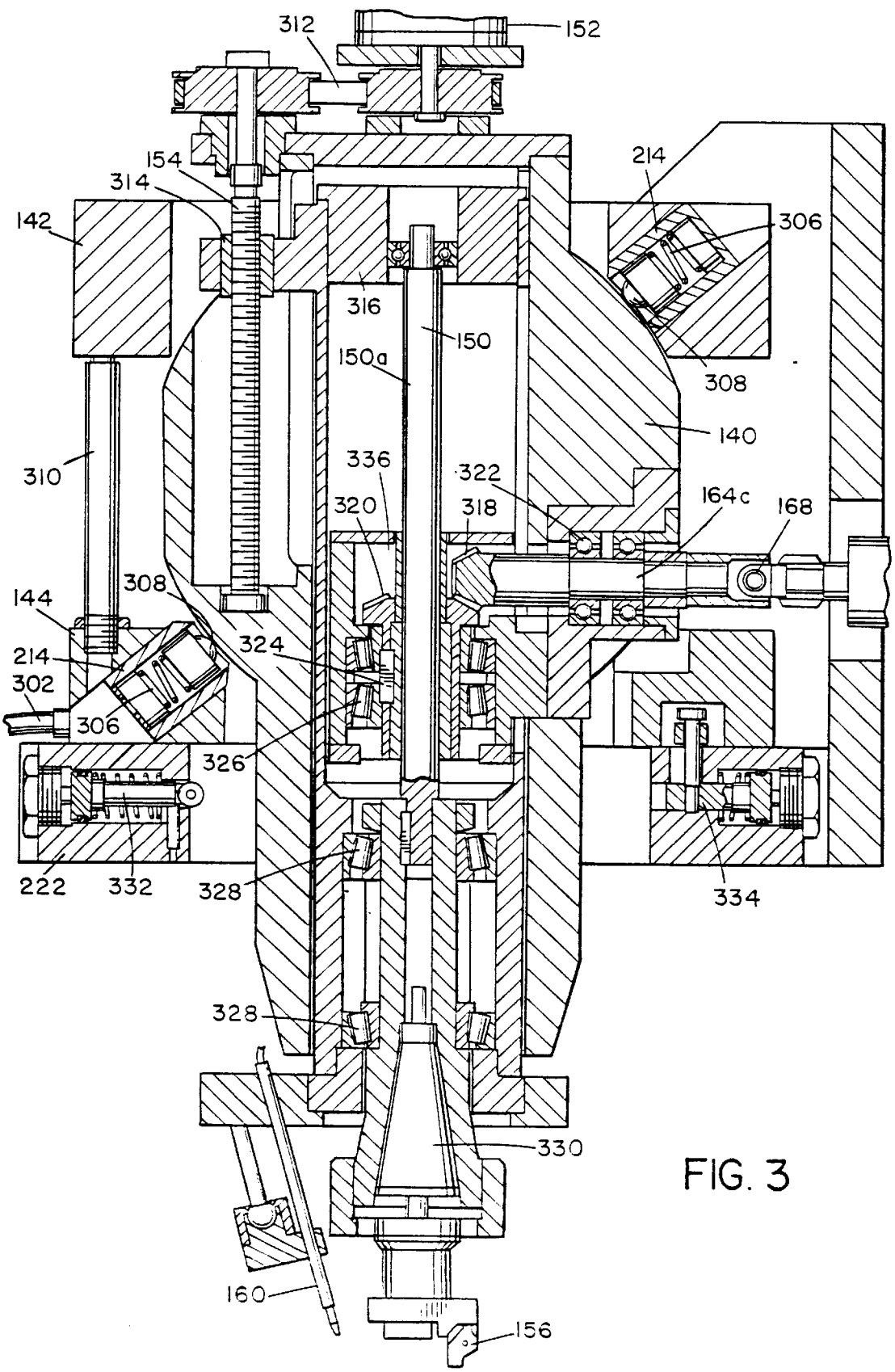
FIG. 3 is an enlarged sectional view taken on line 3—3 of FIG. 2.

Referring still to FIG. 3, spherical housing 140 is pivotable around its center point (centroid) to provide angular manipulation of the spindle. This adjustability provides means for machining valve seats disposed at an angle with respect to the z-axis. After manipulation of the spherical housing 140 to achieve the desired angle, the air pressure to sphere seat bearings 214 is cut off, causing the ball bearing 308 to retract back into its housing with sphere seat 144. While the weight of the spherical housing may be sufficient to retain its position during machining, it would be preferable to provide means for locking the sphere in position. This locking means can include a locking piston which compresses the spherical housing against the sphere seat, or the sphere seat itself can be used by decreasing the space between lower sphere seat 144 and upper sphere seat 142, which may be done, for example, pneumatically, hydraulically or by a screw-type adjustment. For example, connection bolt 310, which joins the upper and lower sphere seats, could be a piston which is compressed pneumatically. Note that while only one connection bolt 310 is visible in the figures, at least two, and preferably three connection bolts 310 are used, placed at equal spacings around the rings which make up sphere sets 142 and 144.

Still referring to FIG. 3, stepper motor 152 is fixedly mounted on top of spherical housing 140 and is connected via drive belt (or chain) 312 to drive screw 154, which is disposed within a slotted cavity in the spherical housing. Carriage 314 runs up and down drive screw 154 as it turns and is connected by linkage 316 to spindle 150.

Stepper motor 152 is controlled by system controller 162, which may be a microprocessor with control software, to provide small range z-axis adjustment to complement the large range z-axis movement provided by the pantograph. Stepper motor 152 also drives the feed of the spindle during machining and retraction after completion. The speed at which the spindle is fed is controlled by system controller 162 which also received input from the tachometer 170 of drive motor 138 so that the correct feed rate is provided based upon the speed of the drive motor. Other control software may be provided to provide further control data, such as the hardness of the material of which the cylinder head is made, allowing adaptation of the machining speeds depending on the material.

Further input to the system controller is provided by linear gauge 160, which is shown in the art, which measures the distance to the surface of the cylinder head to control stepper motor 152 to assure accurate depth machining of the valve seats regardless of the orientation of the cylinder head surface relative to the x, y plane. Since linear gauge 160 moves with the spindle, it will always be appropriately angled for providing the distance measurement.

Rotation of spindle 150 is driven by drive motor 138 and transmission linkage 164. As illustrated, section 164c of the transmission linkage is connected at its distal end to universal joint 168 and at its proximal end to cone-shaped pinion 318. Bearings 322 are fixed within spherical housing 140 and serve to stabilize the linkage section 164c. Pinion 318 cooperates with cone-shaped pinion 320 on a roto-translator arbor 324 to rotate spindle 150. Bearing sets 326 are contained within a housing 336 formed within spherical housing 140 to guide pinion 320 and do not move with the spindle. Pinion 320 is also retained within housing 336. Bearing sets 328 serve to further stabilize the spindle to ensure uniform concentric rotation. The spindle 150 includes arbor 150a at its upper portion. Arbor 150a is driven by pinion 320, and moves up and down with respect to pinion 320.

Fixed at the lower end of spindle 150 is tool holder 330 to which is attached the cutting tip 156. The cutting tip 156 is typically tungsten carbide, ceramic coated carbide or other hard alloys, and selection of an appropriate tip and tool holder 330 is known in the art. The pilot 158 (shown in FIG. 1) is all held by tool holder 330. Selection of an appropriate pilot is within the level of skill in the art.

After completion of the machining of a valve seat and the retraction of the pilot from the valve guide, the spindle is recentered before proceeding to the next machining site. Recentering is achieved by the use of pneumatic jacks/pistons 332 and 334, which are shown in FIG. 3 and illustrated in more detail in FIGS. 6 and 7, respectively.

Referring to FIG. 6, pneumatic jack/piston 332 is retained within cavity 602 of support frame 222. There are preferably more than two pneumatic jacks/pistons 332 provided, distributed at equal spacings around support frame 222. To recenter the spherical housing, pneumatic jack/piston 332 is activated by admitting air pressure into chamber 604 which applies pressure to cylinder 606, depressing spring 608 and forcing piston 610 toward the neck portion 612 of spherical housing 140. If the neck portion 612 is closer than the full travel of the piston 610, it will be pushed back toward center. The length and travel of each of the pneumatic jacks/pistons are selected to center the spindle along the z-axis. At the same time that the angular recentering step is being performed, sphere seat bearings 214 are enabled to facilitate pivoting of the sphere.

Figure 7:
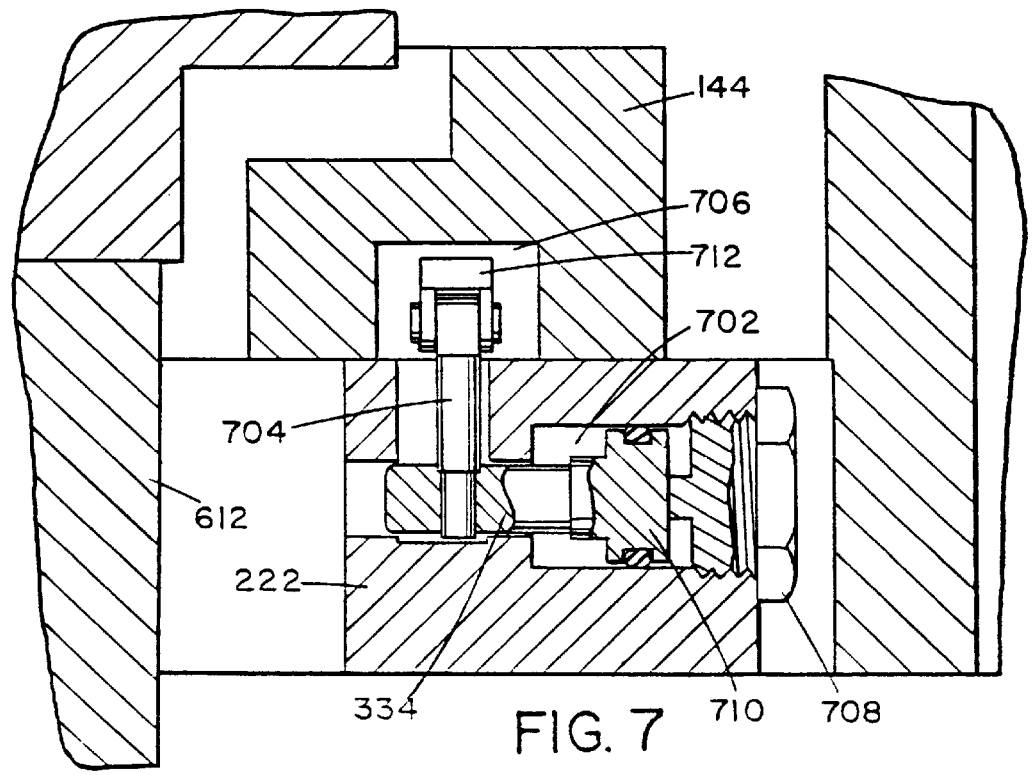
FIG. 7 is an enlarged detail of another portion of FIG. 3.

Now referring to FIG. 7, pneumatic jack/piston 334 is retained within cavity 702 of support frame 222 with extension 704 extending into cavity 706 of sphere seat 144. As previously described, sphere seat 144 is capable of small range x, y transaction with respect to support frame 222, with such motion being facilitated by an air cushion created between the sphere seat 144 and support frame 222. To recenter the spindle at the zero position, i.e., x=0, y=0, air pressure is introduced through plug 708 which forces piston 710 inward. The head portion 712 of extension 704 moves inward to contact the walls of cavity 706, pushing the sphere seat 144 for the full travel of piston 710 and back to the zero position at the same time the piston 334 is activated the air cushion between sphere seat 144 and support frame 222 is activated to move the sphere seat 144. There are preferably four, and a minimum of three, such pneumatic jacks/pistons 334 to provide +x, −x, +y, and −y correction. Alternatively, simultaneously pneumatic jack/piston may have extendible plugs which pop outward in each of the four directions to contact all four walls of the cavity 706. In this case only one, or possibly two, such pistons would be required. Similarly, one or more pairs of pneumatic jacks/pistons could have one piston with pop-out plugs along the x-axis and one with pop-out plugs along the y-axis could be used. Any combination of the described pneumatic jacks/pistons may also be used.

Figure 4:
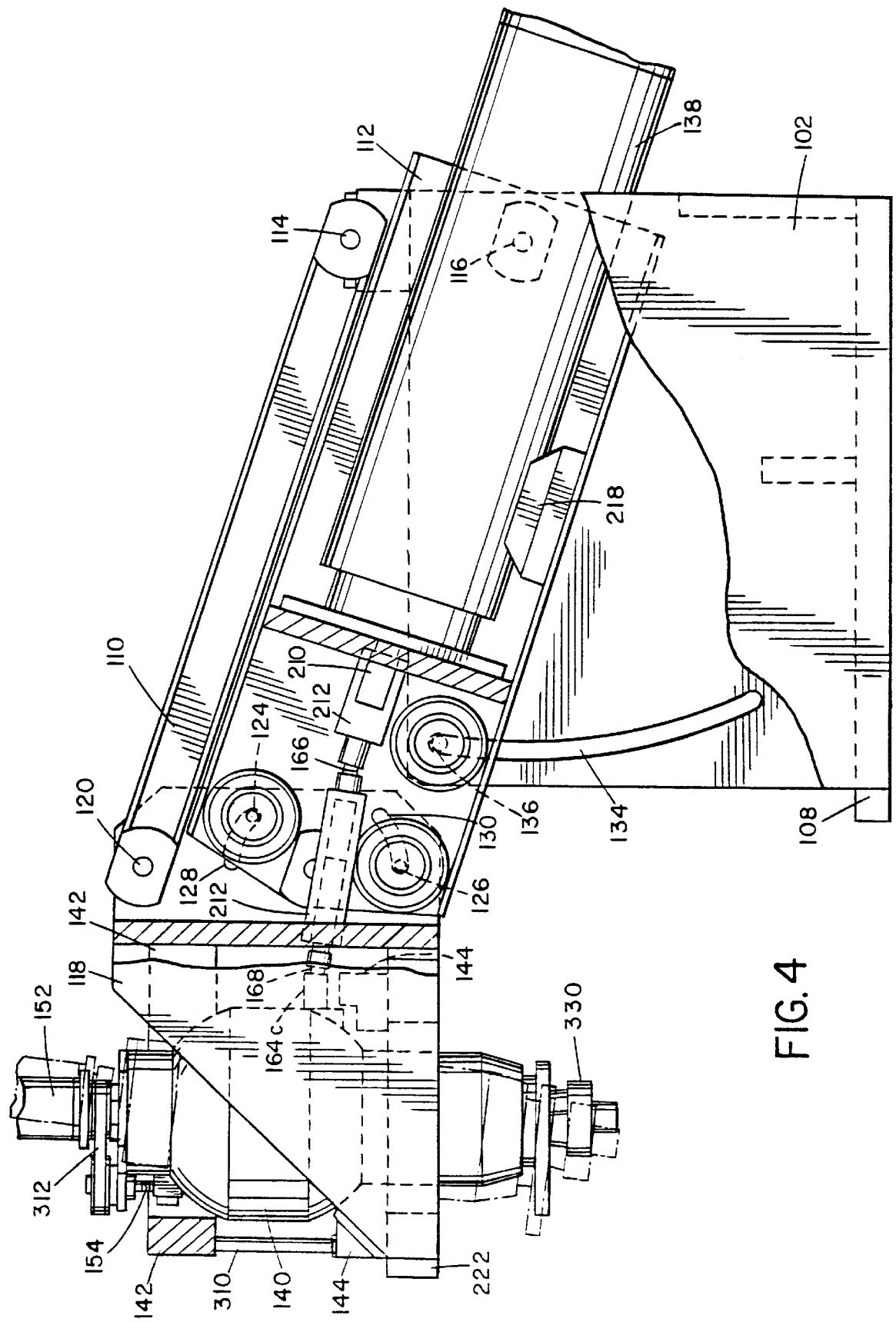
FIG. 4 is a side elevation view, partially cut away, with the drilling head in the uppermost position.
Figure 5:
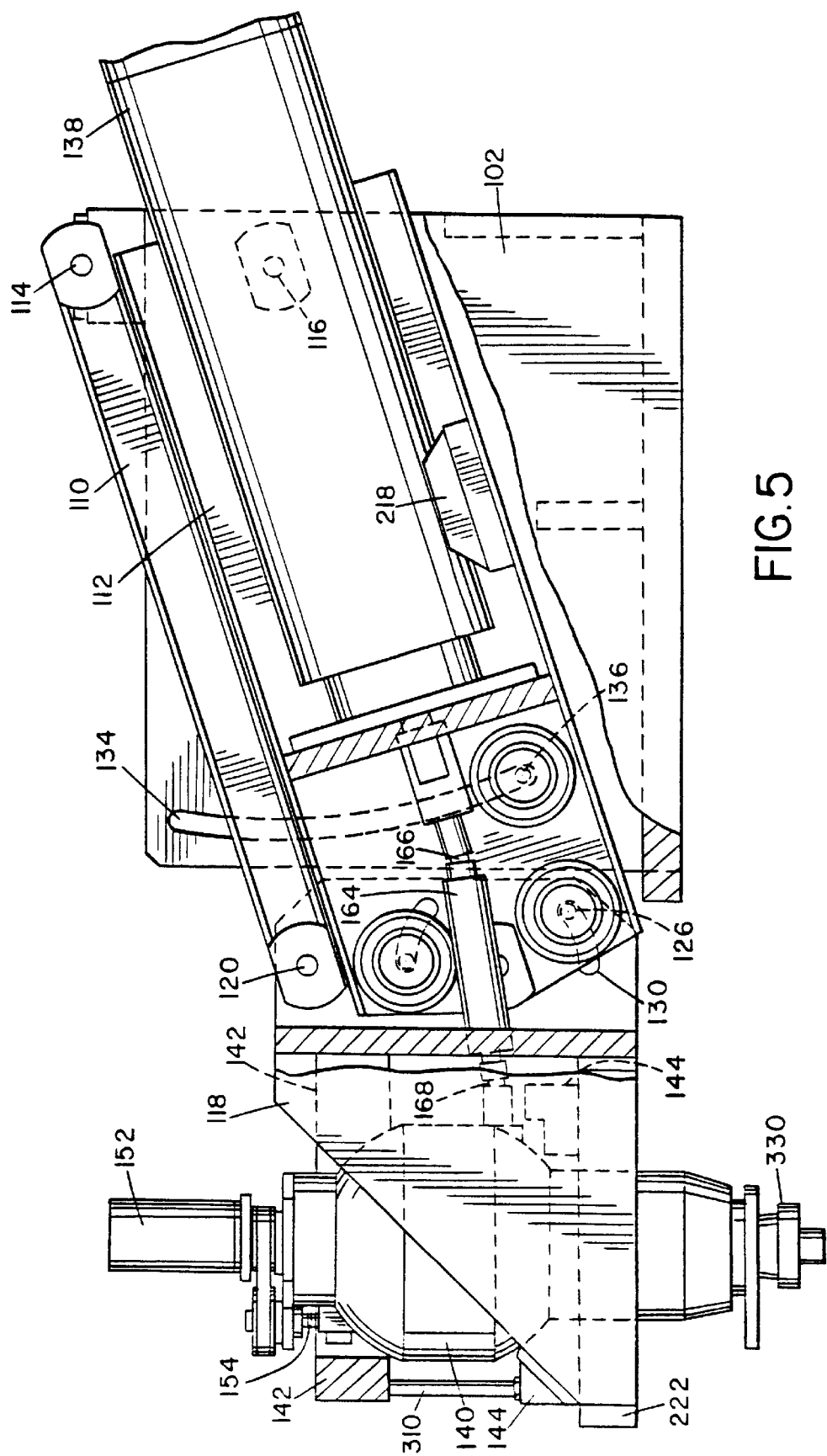
FIG. 5 is a similar side view with the head in a lower position.

The operation of the pantograph and spherical housing will become more apparent by viewing FIGS. 4 and 5.

In FIG. 4, the pantograph is positioned to raise the spindle assembly, for example, when a machining step is finished, the proximal end of pantograph arms 110 and 112 are shifted upward and the distal end is moved downward. As is apparent, arcuate channel 134 guides arm 112 as it pivots about point 116. Due to the relative pivoting between frame 118 and the pantograph arms, the bottom 132 of frame 118 and the pantograph arms, the bottom 132 of frame 118 remains parallel with the x, y plane. To assure retention of linkage between drive motor 138 and the spindle (not shown here), transmission linkage 164 has universal joints 166 and 168 which pivot while still maintaining connection Further, since the relative angle between the motor and spindle portions of the system changes the length requirements of the linkage, telescoping connectors consisting of sleeve 212 and shaft 210 are provided to provide for lengthening or shortening of the linkage 164 as needed to maintain connection.

Also provided in FIG. 4 is an illustration of the spherical housing 140 in the zero position (solid lines) and with an angular shift (slashed lines) to permit machining of valve seats positions at an angle relative to the x, y-plane.

FIG. 5 illustrates the inventive system with the pantograph moved to the low position to facilitate machining of lower profile cylinder heads.

Again, the pantograph mechanism permits frame 118 to remain aligned horizontally, parallel to the x, y-plane.

The use of the pantograph permits essentially effortless adjustments for large changes in height relative to the base of the system. Fine adjustment of the machining height and depth is provided by stepper motor 152. Similarly, the air cushion platform 108 (shown in FIG. 1), when activated, permits large changes in the horizontal plane while fine x, y adjustment is provided between frame 118 and sphere seat 144. The division of displacements into the separate procedures provides a significant reduction in the mobile masses during centering operations. The large x, y displacement provides adjustment from one valve seat to another while the small x, y displacement provides adjustment from one valve seat to another while the small x, y displacement allows centering of the pilot within the valve guide without flexion of the pilot as occurs in prior art systems.

The large z-axis displacement permits pilot penetration within valve guides and compensates for height differences between cylinder heads. It also eliminates clearance problems encountered in prior art systems, which rely exclusively on slides. Further, the pantograph can be manipulated manually, while prior art slide-based systems require motors or heavyweight manual screw drivers to raise and lower the machine head.

The reduction in mobile mass is further enhanced by the transmission linkage and pinions which permits relative isolation of the spindle drive motor from the spindle. Further, the contacting and driving of the spindle within the spherical housing allows a short, rigid and light spindle while retaining the torque of a powerful drive motor.

Figure 8:
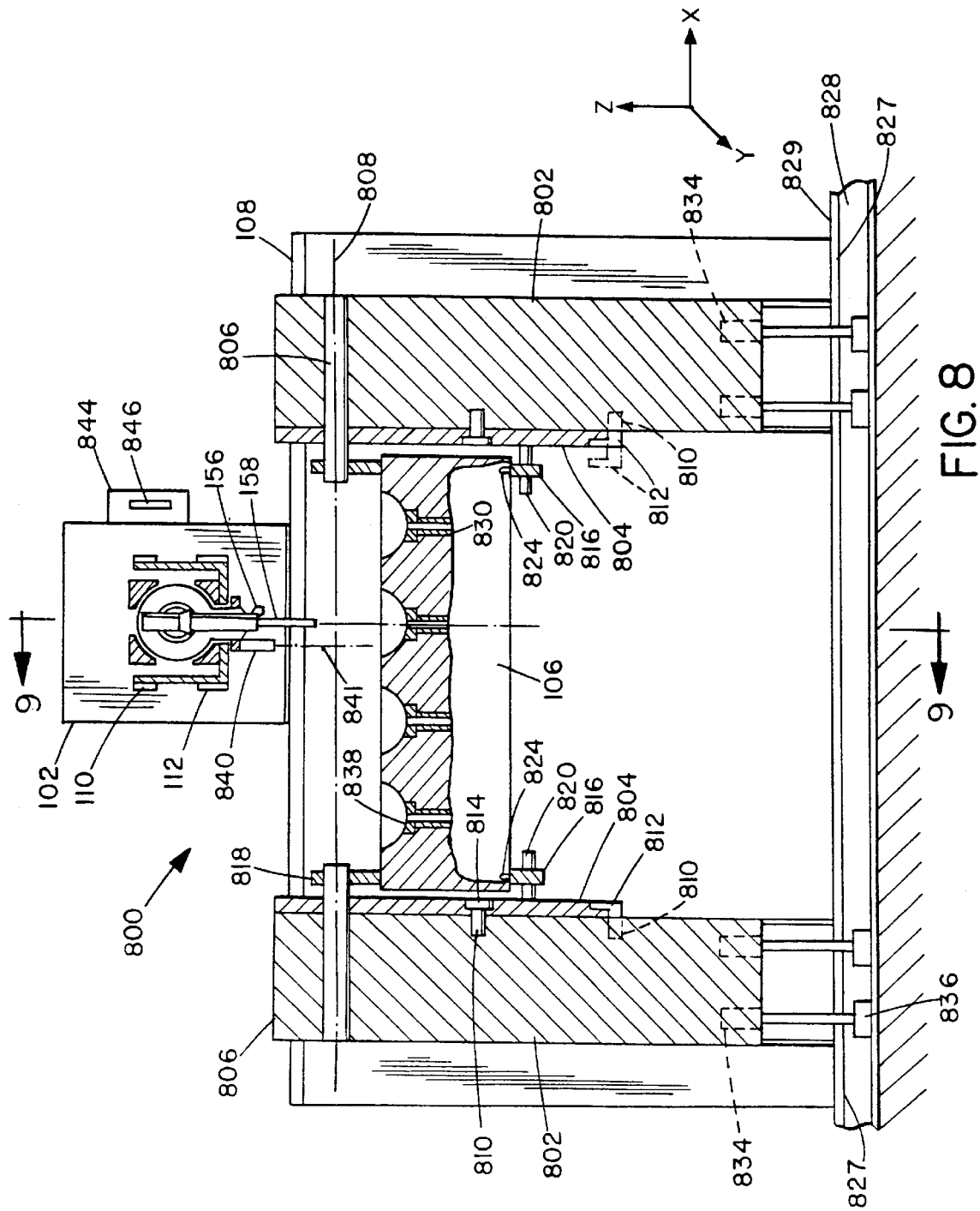
FIG. 8 is a cross-sectional view of an alternative embodiment of the present invention.

Referring now to FIG. 8, an alternative embodiment of the present invention is shown and generally designated 800. The device 800 includes a pair of supports 802 which are each equipped with a clamping plate 804 that pivots on a pivoting support shaft 806. This pivoting support shaft 806 defines the axis of rotation 808 of the clamping plates 804. Each plate 804 is positioned over the pivoting support shaft 806 and held in place with a number of clamping pistons 810. Specifically, a clamping piston 810 is provided with a clamping block 812 or clamping post 814, which, when the piston 810 is activated, is pulled towards the support 802. As the clamping block 812 is pulled towards the support 802, the clamping plate 804 is held securely in place, prohibiting any further rotation of the clamping plate 804 about the pivoting support shaft 806. As shown on the right side of FIG. 8, dashed lines are used to indicate claiming block 812 and piston 810 in a non-retracted position, which permits clamping plate 804 to pivot with respect to support 802.

The cylinder head 106 is secured in place between the two supports 802 by a stop 816 and head clamp 818. More specifically, the stop 816 is positioned on the clamping plate 804 by a stop post 820 which is inserted into a selected stop post hole 822 in the clamping plate 804. Once the stop 816 is attached to the clamping plate 804, a number of pins 824 can be inserted into one or more sockets 826 formed in the contact surface of stop 816 (shown in FIG. 9). These pins 824 are generally positioned to mate with a recessed area in the top planar surface of cylinder head 106 (since the cylinder head is upside-down) to ensure that the cylinder head is prevented from moving laterally along stop 816. Any recessed area in the upper plane of the cylinder head may be used for this purpose such that it is not necessary to match pins 824 with an specific feature in the cylinder head. However, it is often possible to omit any pins 824 because the weight of the cylinder head 106 frequently is sufficient to hold itself in position.

Once the stops 816 are positioned on the clamping plate 804, the cylinder head 106 is placed between the clamping plates 804 and held against the stop 816 with a head clamp 818. The head clamp 818 is inserted over the pivoting support shaft 806 and positioned adjacent the end of the cylinder head 106. To secure the cylinder head 106 against the stop 816, the head clamp 818 is equipped with a pair of clamping screws 826 which can be tightened against the cylinder head 106 (more clearly shown in FIG. 9). Once the clamping screws 826 have been tightened, the cylinder head may be freely rotated about the rotational axis 808, and clamped at a particular angle by engaging the clamping pistons 810.

In addition to rotating the cylinder head 106, the entire assembly of the cylinder head 106 and supports 802 may be moved. This is accomplished by sliding the supports 802 in the x-direction along parallel rails 828 which are mounted on the base 100. It should be noted that there are a pair of rails 828 with corresponding channels 829, which, due to the cross-sectional nature of FIG. 8, are superimposed, with one behind the other and, thus, are not fully shown. Once the supports 802 and cylinder head 106 have been positioned so that a selected valve guide 830 is directly beneath the pilot 832, the supports 802 may be locked in place. Locking is achieved by use of a piston 834 at the lower end of support 802 that pulls a clamping foot 836 located within channel 829 in rail 828 upwards against the upper inside surface 827 of rail 828. Once engaged, the piston 834 holds the clamping foot 836 against surface 827, thus preventing lateral movement of the supports 802 on the base 100. By disengaging the clamping foot 836 and sliding the supports 802 in the x-direction, a number of valve seats 838 may be easily machined in a single cylinder head 106. In order to assist in the lateral movement of supports 802, each support 802 may be equipped with an air cushion that reduces friction between the contact surfaces of rails 828 and support 802, or base 100 and support 802. In either case, the air cushion facilitates the effortless movement of supports 802 and cylinder head 106 for machining of the various valve seats 838.

In order to provide precision depth control of the valve seat cutting, a distance sensor 840 is mounted parallel to spindle 842. As spindle 842 is lowered into cylinder head 106 to cut valve seat 838, distance sensor 840 is also lowered. In order to ensure a proper measurement, a reference point should be selected on the surface of cylinder head 106. Typically, the area of cylinder head 106 immediately surrounding the valve seat 838 to be cut is the optimal reference point. Such a reference point will generally be consistent from valve seat to valve seat, and even from cylinder head to cylinder head. Thus, by selecting a consistent reference point, the precise depth of a valve seat 838 may be maintained between valve seats 838 of a single cylinder head 106, as well as between various cylinder heads 106. The distance sensor 840 used in the prototype of the present invention is Laser Displacement Sensor Model No. Z4M-WR, manufactured by Omron, however, similar laser measurement systems are readily available from a number of different manufacturers and may be substituted. In the prototype system, the sensor emits a visible laser beam 841 to project a spot for easy selection of the reference point on the cylinder head 106. Use of the visible laser beam allows set up of the measurement without requiring additional measurement or calibration tools. By positioning the distance sensor laser spot on a known reference point on the cylinder head 106, the consistent machining of valve seats 838 is facilitated. Use of a laser displacement sensor permits a valve seat to be machined within a tolerance of less than 0.01 mm.

In an effort to increase the consistency of the machining of valve seats 838, the device 800 may be equipped with a memory card device 844 which both reads and writes stored information relating to the machining of the cylinder head 106. The memory card device 844 is mounted to the machine to allow easy access for inserting and removing the memory card (not shown). The various machining parameters of the particular cylinder head can be saved to the memory card to facilitating repeating of a particular machining operation without the need to re-enter the information into the machine's controller. Each memory card is dedicated to a single cylinder head, or family of cylinder heads such that, by inserting the memory card into the slot in the memory card device 844, the specific parameters of a particular machining task is loaded into the controller. This ensures that whoever is using the machine 800, regardless of their experience level or personal preferences, will machine the cylinder head according to the specifications stored on the memory card. Because of the ease of programming and reading the memory card, particular customers may wish to have their own dedicated memory card. In fact, there could be a memory card for each family of cylinder heads, such as Ford, Chevrolet, etc., which would store the optimum machining characteristics for each.

In addition to storing set-up parameters after the system's user has determined the required procedure for a given cylinder head, the memory card can also have dimensional specifications and/or set-up parameters selected and stored by the vehicle OEM (original equipment manufacturer), so that machining can be done in accordance with the manufacturer's specifications, assuring uniformity from engine to engine of the same type, and facilitating repairs where a repair shop services a large number of the same make and model of a given vehicle.

The memory card, commonly called a "smart card" or "token smart card" which is used in the prototype of the present invention is available from a ELEA, or GEMPLUS, both of France (where the smart card originated), as well as being available from a number of different manufacturers worldwide. (See, e.g., Bright, Smart Cards: *Principles, Practice, Applications*, Holsted Press, 1988.) Such cards use either a programmable microchip or a magnetic strip on its back side to store up to 256 bytes of information. The memory card device is a commercially available card reader which is electronically interfaced to the system's controller. Thus, once the memory card is inserted into the slot 846, the digital information which is stored on the card is retrieved by the controller to automatically set up the machining of the cylinder head. As this method of storing information is common in other fields, the details of the particular method of encoding and decoding the digital information from the memory card is not discussed here.

Figure 9:
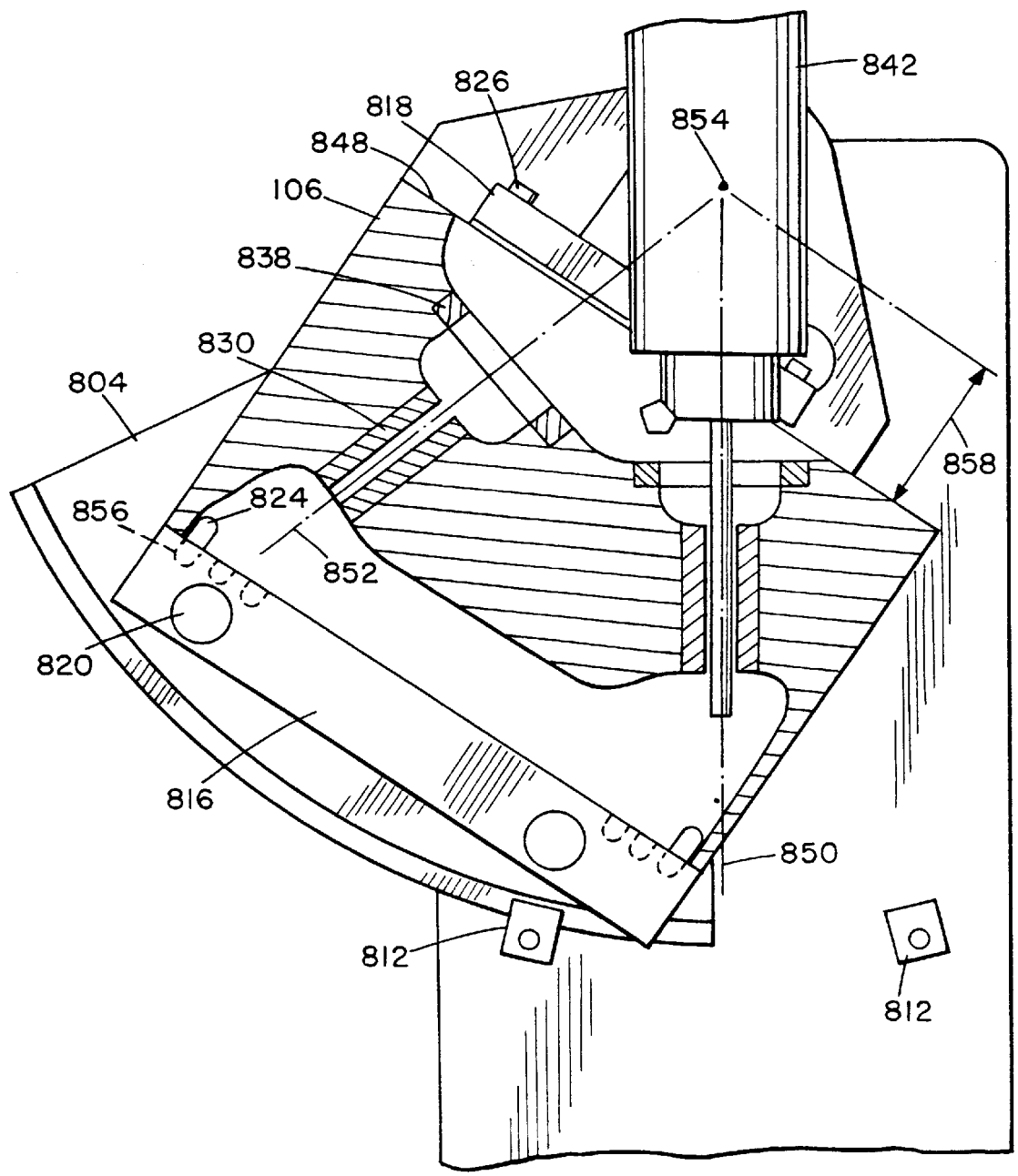
FIG. 9 is a cross-sectional view of the present invention taken on line 9—9 of FIG. 8.

Referring now to FIG. 9., the importance of the rotational axis 808 can be appreciated. Specifically, many cylinder heads 106 feature valves which are spread on two inclined planes with respect to the gasket plane 848 of the cylinder head. As appreciated from FIG. 9, the first inclined plane 850 and the second inclined plane 852 intersect at a point some distance above the cylinder head 106. This intersection, as shown, represents a common point 854 which, if the cylinder head 106 is rotated about that point, would allow machining of the cylinder head without repositioning the spindle 842. By rotating the cylinder head about the intersection 854 of the first and second inclined planes 850,852, the valve guides 830 may be maintained in a perfectly vertical orientation. This is particularly important due to the limited travel of the spindle 842 in the x or y directions. Since the spindle 842 is primarily designed to travel in the z direction, the precise orientation of the valve guide 830 in the z direction minimizes any bending or flexing of the pilot 832, while also insuring the best possible machining.

In order to position the cylinder head 106 on the clamping plate 804 such that the first and second inclined planes 850,852 intersect at the rotational axis 808, the stop 816 is positioned in the proper location on the clamping plate 804. Perhaps more clearly shown in FIG. 10, the stop posts 820 are inserted into one of the stop post holes 822 depending upon the size of the particular cylinder head 106. Cylinder heads 106 having various heights may be accommodated using the different stop post holes 822 formed in the clamping plate 804. Once the stop 816 is positioned, a number of pins 824 are inserted it the sockets 856 formed in the stop 816. While such pins 824 are not always necessary, they are generally positioned to mate with a recessed area within cylinder head 106 to ensure that the cylinder head is retained in a proper location on the stop 816. Once the pins 824 are positioned on the stop 816, the cylinder head 106 is placed on the stops 816 so that it will not slide while rotated with the clamping plate 804.

Once positioned on the stop 816, the cylinder head 106 is firmly clamped in place by the head clamp 818 which is equipped with a pair of clamping screws 826. The clamping screws 826 facilitate securing the cylinder head in place which, given the precision of the machining process, is particularly important. By using different stop post holes 822 and different thickness head clamps 818 to adjust the distance between the bottom plane of cylinder head 106 and rotational axis 808, virtually any cylinder head, regardless of height and bore spread, can be accommodated, and the "optimal machining height" can be attained.

Referring back to FIG. 8, once the cylinder head 106 is positioned on the clamping plate 804, the clamping plate 804 is rotated about the rotational axis 808 so that the valve guide 830 is in line with the pilot 832. The clamping pistons 810 are then engaged to pull the clamping blocks 812 and clamping post 814 against the support 802 thus holding the cylinder head 106 at the optimum angle for the machining process. Although the preferred embodiment incorporates a hydraulic device, the clamping pistons 810 may be of a variety of types, including hydraulic, pneumatic, or mechanical. While the particular operation of the piston is not critical, the ability to simultaneously activate and de-activate all of the clamping pistons is important. This provides a significant improvement over existing machines in which the cylinder heads are mounted to a base using a number of manually installed screws or clamps. In such systems, each time the cylinder head is to be moved, the screws or clamps had to be removed and re-installed, by necessity in a sequential manner until each screw or clamp was adjusted. By providing the device with a simple and simultaneous manner of clamping and orienting the cylinder head, the time required for the machining process is greatly reduced.

Once the cylinder head 106 is aligned and clamped in place, the machine is activated to lower the spindle 842 and cut the valve seat 838 to the precise depth with the aid of the distance sensor 840 discussed in conjunction with FIG. 8. Following the cutting of the first valve seat, the clamping pistons 810 are disengaged to allow the repositioning of the cylinder head so that the next valve guide 830 is in line with the pilot 832. Then, as before, the clamping pistons 810 are engaged to hold the cylinder head 106 in place at the appropriate angle, and the valve seat 838 is cut in the same manner as discussed above. Referring again to FIG. 8, it is to be appreciated that use of the supports 802 and clamping plates 804 allows the cylinder head to be mounted in a single step, such that the machining of the entire cylinder head can be achieved without the need for remounting. This is particularly important when the time required for mounting the cylinder head can actually exceed the time it takes to perform the actual machining task. Thus, by minimizing the time required to mount the cylinder head, the time required for the overall machining process is greatly reduced.

Referring now to FIG. 11, an alternative embodiment of a spherical seat is shown and generally designated 862. In this embodiment, the spherical seat utilizes a pneumatic piston 864 which forces a supporting ball 866 outward from the spherical seat 862 so that the spherical housing 140 is raised off of the sphere seat 862 by a small clearance 868. It should be noted that only the slightest clearance is required since the purpose of this arrangement is to minimize the friction between the surface of the spherical housing 140 and the sphere seat 862. As in the spherical seat 144 discussed in conjunction with FIG. 6, once the spherical housing 142 is raised off of the sphere seat 862, the spherical housing 142 may be rotated freely about the center of the sphere. However, in the spherical seat 144 shown in FIG. 6, the spring 306 is compressed so that the sphere 140 strikes the sphere seat 144 in order to secure the spherical housing in place. While this method of positioning the sphere is effective, small deviations from the optimal positioning may be introduced by the compression of the springs 306 since it may be difficult to precisely match the several springs incorporated in the device. If one spring is compressed before another when the sphere seat 142 is lowered, a small change in the position of the spindle relative to the cylinder head can result.

The sphere seat 862 which incorporates a pneumatic piston 864 does not suffer from the same error introduced by spring mismatch as described above because, when the pneumatic pistons 864 are engaged, all of the pistons rise simultaneously so that the piston stops 870 strike the surface of the adjustment nut 872. Adjustment nut 872 can be varied in height so that the clearance 868 between the sphere 140 and the sphere seat 862 is minimized, creating only enough of a clearance to allow movement of the sphere within the sphere seats. As the piston 864 is forced outward from the sphere seat 862, the supporting ball 866 which rests on a bearing 876 is forced outward to strike the spherical housing 140. Support ball 866, with its associated bearing 874, facilitates movement of the spherical housing 140 while the piston 864 is engaged. Once the pistons 864 are disengaged, each supporting ball 866 retracts simultaneously so that the spherical housing 140 is lowered to the sphere seat 862. After the pistons are lowered, the upper sphere seat 142 can be lowered onto the spherical housing 140 to hold it securely. Because all of the pneumatic pistons 864 retract simultaneously, no error is introduced by displacement of the sphere's centroid, and any resulting offset in the spindle 842 is avoided.

The ability to adjust the clearance 868 between the spherical housing 140 and the sphere seat 862 almost completely eliminates error introduced into the position of the spherical housing 140.

As with the sphere seat 142 shown in FIG. 6, the embodiment of the sphere seat 862 of FIG. 8 is also equipped to create an air cushion. Float chamber 876 is disposed on the bottom of the sphere seat 862 such that when air is supplied through the air channel 878, an air cushion is formed between the support frame 222 and the sphere seat 862. As discussed before, this air cushion allows for small x-y movements of the spherical housing 140 without the need for the application of enough force to overcome friction or the mass of a large body, which can make it difficult to apply the exact force needed to move the spindle without overshooting the desired position. Thus, precise alignment of the spindle 842, pilot 158, and cutting bit 156 is made possible without relying on the damping function of the pilot within the valve guide to overcome the inertia of the machining head, as in prior art systems.

In addition to the hardware discussed above, the preferred embodiment of the present invention includes a variety of software features which facilitates the machining of the cylinder heads. Specifically, there are three features which greatly simplify and improve the machining of the cylinder heads including a step feed feature, a learn feature, and an auto centering feature. The step feed feature allows the operator to cut a valve seat 838 manually be turning a rotary control knob on the control panel of the machine, or by pressing the advance key on the digital control panel. In either case, the operator manually controls the depth of the valve seat. The step feed feature allows the operator to enter the various parameters for the initial valve seat cut, such as the depth increments of each cut. This allows the operator to precisely cut any number of "steps" into the valve seat, while being assured that each step is the appropriate depth to achieve the targeted final depth.

Once the operator has machined the valve seat to the proper depth, the "learn" button is pressed to commit the precise parameters and specification of that valve seat to memory. As discussed above, that memory may be either internal, or may be a removable memory card. In either case, the ability to memorize the particular characteristics of a valve seat allows the operator of the machine to simply reposition the cylinder head under the spindle with a different valve guide aligned with the pilot, and simply push a "cut" button which will identically recreate the valve seat previously cut. Since the parameters of the valve seat are retained in memory, any number of identical valve seats may be machined. This ability to duplicate precise machining parameters removes many of the operator problems associated with machining, such as operator fatigue, lack of attention, bad assessment, etc., thus improving the overall quality of the machining. Further, as previously described, the memory capability of the inventive apparatus also permits repeatable machining of valve seats to comply with OEM specifications by using a pre-programmed memory card provided by the engine OEM. Data included in such a pre-programmed card can include valve seat depth as well as information about the machining requirement of the material of the cylinder head is formed, such as hardness and other factors which effect machining parameters.

In addition to the memorization of particular parameters, the machine of the present invention is capable of re-centering the spindle at any time. This is particularly advantageous in situations involving the machining of successive valve seats in a single cylinder head. Thus, the machine may automatically re-center the spindle so that the operator does not have to be concerned that the spindle not centered when moving from one valve guide to the next. This feature is particularly useful because prior machines have had to be re-centered manually. Not only is the prior art method less reliable, but it also extends the time required to machine a multi-valve cylinder head.

While it is to be appreciated that the above features may be implemented using any number of software configurations, the specific software incorporated in the present invention is included in the Microfiche Appendix, submitted with this application.

In the present invention, the size and mass of the machine head is minimized while retaining the capacity of prior art systems. This is significant since modern engines have smaller valve guides than those of older engines. The prior art systems with their massive machine heads were originally designed for older engines which used pilots on the order of 8 mm in diameter. While these thicker pilots may have tolerated the flexion induced by the centering process, the ringing and flexion is more of a problem with the smaller pilots used in modern engines. To illustrate, the circumference, i.e, the contact surface, of an 8 mm pilot is four times that of a 4 mm pilot. Comparing the masses of the machine heads, the prior art head of 200 kg generates much greater kinetic energy than the 20 kg head of the present invention. Combining this with the decreased diameter and surface of the pilot's required for newer engines, the centering of a prior art machine becomes much more problematic as compared to the present invention.

The system of the present invention further provides a level of control to permit precise machining of the valve seats to the same depth to ensure a balanced compression ration between the engine cylinders. The control is achieved without manual intervention and is made possible by the use of the linear probe, laser displacement subsystem, or other distance measurement means, which controls the descent of the spindle without regard to the angle at which the machining is being done. The probe provides feedback to the system controller, which, in combination with a precision screw drive attached to the stepper motor, can be used for continuous monitoring of the cutting process to assure identical valve seat depth at each location on the cylinder head. Thus, the inventive system provides reliable and repeatable means for optimizing engine output and performance.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. A system for machining a valve seat in an engine cylinder head having a height and having a plurality of valve seats disposed within said engine cylinder head at a plurality of different locations within an horizontal plane and having a plurality of angular displacements from a vertical line comprising:

a work surface lying in a first plane parallel to the horizontal plane;

a base disposed on said work surface;

a stage disposed on said work surface for holding said engine cylinder head;

a first bearing surface between said work surface and one of said base and said stage for movement parallel to said first plane;

a vertical displacement device having a first end and a second end, the first end being attached to said base;

a head portion disposed at said second end of said vertical displacement device, said head portion having a bottom edge, wherein the bottom edge remains parallel to said first plane when the vertical displacement device raises and lowers said head portion within the vertical plane;

a support frame disposed within said head portion adjacent the bottom edge;

a spherical housing having a centroid, an upper portion and a neck portion;

an upper and a lower sphere seat fixedly attached to each other for surrounding and supporting said spherical housing therebetween so that said spherical housing is pivotable around the centroid within said upper and lower sphere seats, said lower sphere seat being supported by and movable parallel to said first plane with respect to said support frame;

a second bearing surface disposed between said support frame and said lower sphere seat;

a least three third bearing surfaces disposed between said upper and lower sphere seat and said spherical housing;

a spindle retained within said spherical housing, said spindle being rotatable within said spherical housing and translatable along a vertical feed/retraction line running through said centroid between the upper portion and the neck portion;

means for retaining a machining tool disposed at an end of said spindle so that said machining tool rotates concentrically with said spindle;

a drive motor connected to said spindle for providing rotational force for rotating said spindle; and a vertical translator connected to said spindle for translating said spindle along the vertical feed/retraction line within said spherical housing;

wherein said machining tool is positioned for machining said valve seat by centering said spindle over said valve seat by one or more of the steps of moving one of said base and said stage on said first bearing surface to provide coarse movement parallel to said first plane, shifting said head portion up and down using said vertical displacement device to provide coarse movement along said vertical plane, moving said lower sphere seat on said second bearing surface to provide fine movement parallel to said first plane, translating said spindle along the vertical feed/retraction line to provide fine movement generally within said vertical plane, and pivoting said spherical housing around the centroid to provide angular displacement of said spindle.

2. A system as in claim 1 further comprising a first plurality of locking means for preventing movement of said vertical displacement device when a coarse machining height of said machining tool over said valve seat is set.

3. A system as in claim 1 further comprising a second locking means for preventing movement of said lower sphere seat with respect to said support frame when said spindle is centered within the horizontal plane over said valve seat.

4. A system as in claim 1 further comprising a third locking means for preventing pivoting of said spherical housing with respect to said upper and lower sphere seats when the angular displacement of said spindle is adjusted to match the angular displacement of said valve seat.

5. A system as in claim 1 further comprising a distance sensor for measuring a distance between said spindle and a top surface of said cylinder head and producing an electrical signal representative of the distance.

6. A system as in claim 5 further comprising a system controller for receiving the electrical signal from said distance sensor and for generating a command signal to said second motor for controlling translation of said spindle.

7. A system as in claim 6 further comprising a tachometer for providing an electrical signal representative of drive motor speed to said system controller and wherein said system controller further provides a second command signal to said drive motor for controlling the drive speed.

8. A system as in claim 1 wherein said transmission linkage includes at least one universal joint to provide angular displacement along said transmission linkage.

9. A system as in claim 1 wherein said transmission linkage includes at least one telescoping joint for provide lengthening and shortening said transmission linkage.

10. A system as in claim 1 wherein each of said transmission linkage and said spindle has a cone-shaped pinion disposed thereon within said spherical housing which cooperate to transfer the rotational force from said drive motor to said spindle.

11. A system as in claim 1, wherein said first bearing surface comprises an air cushion which is deactivated when said spindle is coarsely centered over said valve seat.

12. A system as in claim 1, wherein said second bearing surface comprises an air cushion which is deactivated when said spindle is finely centered over said valve seat.

13. A system as in claim 1, wherein each third bearing surface of said at least three third bearing surfaces comprises a retractable ball bearing.

14. A system as in claim 1, wherein each third bearing surface of said at least three third bearing surfaces further comprises:

a piston chamber formed in said lower sphere seat and having an inlet port;

a piston having a ball housing slidably disposed within said piston chamber;

a support ball rotatably retained within said ball housing so that a surface of said support ball can contact said spherical housing; and means for activating said piston so that said piston is forced outward from said piston chamber causing said support ball to move outward to contact and raise said spherical housing off of said sphere seat.

15. A system as in claim 14, further wherein said piston chamber has a plurality of internal threads and said piston is retained within an adjustment nut having a plurality of external threads for mating with and rotating with respect to the plurality of internal threads of said piston chamber.

16. A system as in claim 1, wherein said cylinder head support further comprises:

a first support member and a second support member, said first support member and said second support member being separated to accommodate a cylinder head therebetween;

a pair of pivot shafts, one said pivot shaft extending away from said first support member and towards said second support member, and one said pivot shaft extending away from said second support member and towards said first support member, said pivot shafts defining a rotational axis;

a pair of clamping plates, each said clamping plate formed with a pivot hole positionable over one said pivot shaft wherein said clamping plate rotates about said pivot shaft in a plane perpendicular to said rotational axis;

a means for attaching a cylinder head between said clamping plates; and a means for clamping said clamping plates at an angle of rotation about said pivot shaft.

17. A system as in claim 16, wherein said means for attaching further comprises:

each said clamping plate having a plurality of stop post holes;

a stop having at least two stop posts, one said stop post being insertable into one said stop post hole; and a pair of head clamps, one said head clamp being attachable to one said pivot shaft, each said head clamp having at least one clamping screw wherein said cylinder head may be secured between said stop and said head clamp for rotation of said cylinder head about said rotational axis.

18. A system as in claim 16, wherein said means for clamping further comprises:

at least one clamping block attached to each said support; and a piston mechanically linked to said clamping block wherein when said piston is activated, said clamping block is drawn towards said support to capture said clamping plate between said clamping block and said support.

19. A method for centering a machining tool for machining a valve seat in an engine cylinder head having a height and having a plurality of valve seats disposed within said engine cylinder head at a plurality of different locations within an horizontal plane and having a plurality of angular displacements from a vertical line, the method comprising:

provisioning a work surface lying in a first plane parallel to the horizontal plane;

disposing a base on said work surface;

disposing a stage on said work surface for holding said engine cylinder head;

moving one of said base and said stage on a first bearing surface to provide coarse movement parallel to said first plane;

shifting a distal end of a pantograph having a pair of arms, each arm of the pair having a distal end pivotally attached to said base so that said pair of arms pivots along a vertical plane perpendicular to said first plane up and down to provide coarse movement along a vertical plane;

pivotally attaching a head portion to a proximal end of each said arm of said pantograph, said head portion having a support frame, wherein the support frame remains parallel to said first plane when the distal ends of said pair of arms of said pantograph are raised and lowered within the vertical plane;

disposing a spindle for holding said machining tool in a spherical housing having a centroid, an upper portion and a neck portion, said spherical housing being pivotable around the centroid to provide angular displacement of said spindle, wherein the spherical housing is supported by an upper and a lower sphere seat fixedly attached to each other, said lower sphere seat being supported by and movable parallel to said first plane with respect to said support frame;

moving said lower sphere seat with respect to said support frame to provide fine movement parallel to said first plane;

translating said spindle along a vertical feed/retraction line to provide fine movement within said vertical plane;

moving at least three retractable bearing surfaces disposed within said lower sphere seat into contact with said spherical housing; and pivoting said spherical housing around said centroid.

20. The method of claim 19 wherein the step of moving at least three retractable bearing surfaces comprises:

disposing each retractable bearing surface of said at least three retractable bearing surfaces on a piston slidably disposed within said power sphere seat; and activating said piston to force said retractable bearing surface against said spherical housing.

21. The method of claim 19 further comprising the step of measuring a distance between said spindle and a top surface of said cylinder head with a distance sensor and producing an electrical signal representative of the distance.

22. The method of claim 21 further comprising the step of providing the electrical signal from the linear gauge to a system controller for and for generating a command signal to a second motor for controlling translation of said spindle.

23. The method of claim 22 further comprising the step of measuring the drive speed of a drive motor for rotating said spindle and providing an electrical signal representative of drive motor speed to said system controller and further providing a second command signal to said drive motor for controlling the drive speed.

24. A system for machining a workpiece having a height and a plurality of work sites located on a surface lying substantially in a common plane, the system being positioned upon a work surface in a horizontal plane, the system comprising:

a support means for retaining said workpiece in a fixed relation with respect to said work surface so that said common plane is substantially parallel to said horizontal plane;

a base disposed on said work surface, said base being movable within a first limited range along said horizontal plane with respect to said support means;

a support frame attached to said base, said support frame being movable with respect to said base in a generally vertical plane, said support frame having a bottom edge, wherein the bottom edge remains parallel to said work surface;

a plurality of retractable bearing surfaces mounted on said support frame, said plurality of bearing surfaces being movable within a second limited range with respect to said support frame parallel to said horizontal plane, said second limited range being smaller than said first limited range;

a spherical housing supported within said support frame so that said spherical housing can be pivoted around a centroid of said spherical housing;

a spindle at least partially retained within said support frame, said spindle being rotatable within said support frame and translatable along a vertical feed/retraction line running longitudinally through said spindle;

a cutting tool attached to and extending from said spindle generally concentric with said vertical feed/retraction, said cutting tool adapted to rotate with said spindle;

a translational means for translating said spindle along the vertical feed/retraction line within said spherical housing; and a drive motor linked to said spindle for providing rotational force for rotating said spindle;

wherein said machining tool is positioned for machining said workpiece by first moving said base with respect to said work surface to provide coarse movement parallel to said horizontal plane so that said spindle is generally positioned over one work site of said plurality of work sites and by second moving said support frame with respect to said base to provide fine movement parallel to said horizontal plane so that said spindle is centered over said one work site, and translating said spindle along said vertical feed/retraction line to provide movement generally within said vertical plane.

25. A system for machining a workpiece as in claim 24 further comprising a first bearing surface disposed between said base and said work surface.

26. A system for machining a workpiece as in claim 25 wherein said first bearing surface is an air bearing.

27. A system for machining a workpiece as in claim 25 further comprising a second bearing surface disposed between said support frame and said plurality of retractable bearing surfaces.

28. A system for machining a workpiece as in claim 27 wherein said second bearing surface is an air bearing.

29. A system for machining a workpiece as in claim 28 further comprising at least one locking piston for locking said plurality of retractable bearing surfaces with respect to said support frame.

30. In a system for machining a workpiece having a plurality of work sites located on a surface lying substantially in a common plane, the system being positioned upon a work surface generally in a horizontal plane, and comprising a stage for retaining the workpiece; a base disposed on the work surface, one of the stage and the base being disposed in a fixed relationship with the work surface and the other of the stage and the base being movable within a first limited range with respect to the work surface; a support frame attached to the base, the support frame being movable with respect to the base in a generally vertical plane, the support frame having a bottom edge, wherein the bottom edge remains generally parallel to the work surface; a plurality of retractable bearing surfaces mounted on the support frame; a spherical housing supported within the support frame on the plurality of retractable bearing surfaces so that the spherical housing can be pivoted around a centroid of the spherical housing; a spindle rotatably retained within the spherical housing; a vertical translator attached to the spindle for translating said spindle within the spherical housing along a vertical feed/retraction line; a cutting tool extending from the spindle; and a drive motor connected to the spindle for providing rotational force to the spindle; the improvement comprising:

the plurality of bearing surfaces being adapted to be movable within a second limited range with respect to the support frame parallel to the work surface, the second limited range being much smaller than the first limited range, wherein the machining tool is positioned for machining the workpiece by first moving one of the stage and the base with respect to the work surface to provide coarse movement parallel to the work surface so that the spindle is generally positioned over one work site of the plurality of work sites and by second moving the plurality of bearing surfaces with respect to the support frame to provide fine movement parallel to the work surface so that the spindle is centered over the one work site, and translating the spindle along the vertical feed/retraction line to provide movement generally within the vertical plane.

31. In a system for machining a workpiece having a plurality of work sites located on a surface lying substantially in a common plane, the system being positioned upon a work surface generally in a horizontal plane, and comprising a support means for retaining the workpiece in a fixed relationship with respect to the work surface; a base disposed on the work surface, the base being movable within a first limited range with respect to the support means; a support frame attached to the base, the support frame being movable with respect to the base in a generally vertical plane, the support frame having a bottom edge, wherein the bottom edge remains generally parallel to the work surface; a plurality of retractable bearing surfaces mounted on the support frame; a spherical housing supported within the support frame on the plurality of retractable bearing surfaces so that the spherical housing can be pivoted around a centroid of the spherical housing; a spindle rotatably retained within the spherical housing; a translational means attached to the spindle for translating said spindle within the spherical housing along a vertical feed/retraction line; a cutting tool extending from the spindle; and a drive motor linked to the spindle for providing rotational force to the spindle; the improvement comprising:

a transmission linkage for linking said drive motor which is located within said base to said spindle, said transmission linkage having at least one universal joint disposed adjacent a first end and a first pinion disposed at a second end; and a second pinion disposed on said spindle, said second pinion cooperating with said first pinion for so that, when said first pinion rotates, said second pinion causes said spindle to rotate.

32. The improved system of claim 31, the transmission linkage further having a telescoping joint.

33. The improved system of claim 31, further comprising a roto-translator arbor attached to said second pinion for transferring a rotational force from said second pinion to said spindle.

34. In a system for machining a workpiece having a plurality of work sites located on a surface lying substantially in a common plane, the system being positioned upon a work surface generally in a horizontal plane, and comprising a support means for retaining the workpiece in a fixed relationship with respect to the work surface; a base disposed on the work surface, the base being movable within a first limited range with respect to the support means; a support frame attached to the base, the support frame being movable with respect to the base in a generally vertical plane, the support frame having a bottom edge, wherein the bottom edge remains generally parallel to the work surface; a plurality of retractable bearing surfaces mounted on the support frame; a spherical housing supported within the support frame on the plurality of retractable bearing surfaces so that the spherical housing can be pivoted around a centroid of the spherical housing; a spindle rotatably retained within the spherical housing; a translational means attached to the spindle for translating said spindle within the spherical housing along a vertical feed/retraction line; a cutting tool extending from the spindle; and a drive motor linked to the spindle for providing rotational force to the spindle; the improvement comprising:

a pantograph having a first pair of pantograph arms and a second pair of pantograph arms disposed below said first pair of pantograph arms, one of each pair of pantograph arms being disposed on opposing sides of said base, each pantograph arm being pivotably connected at a first end to said base and at a second end to said support frame, each of said second pair of pantograph arms further having a plurality of lugs for cooperating with a first arcuate channel disposed in said base and at least one second arcuate channel disposed in said support frame so that the bottom edge of said support frame remains parallel to the work surface when said support frame is moved along a z-axis.

35. An improved system as in claim 34, wherein said drive motor is attached to and moveable with said second pair of pantograph arms.

36. An improved system as in claim 35, wherein said drive motor is linked to said spindle by a plurality of universal joints so that said drive motor and said spindle are moveable at an angle relative to each other.

37. A system as in claim 1, wherein said vertical displacement device is a pantograph.

38. A system as in claim 1, further comprising a system controller for generating a control signal for controlling a rotational speed and a translational speed of said spindle.

39. A system as in claim 38, further comprising a memory device for storing and for providing to said system controller a plurality of data including at least one of a group of set-up parameters, operating parameters, and dimensional specifications.

40. A system as in claim 39, wherein the plurality of data includes step feed data, the step feed data including an incremental cutting depth and a number of cutting steps for cutting said plurality of valve seats.

41. A system as in claim 39, wherein the set-up parameters and the operating parameters for storage in said memory device are obtained by cutting an initial valve seat of said plurality of valve seats.

42. A system for machining a workpiece as in claim 24, further comprising a system controller for generating a control signal for controlling a rotational speed and a translational speed of said spindle.

43. A system for machining a workpiece as in claim 42, further comprising a memory device for storing and for providing to said system controller a plurality of data including at least one of a group of set-up parameters, operating parameters, and dimensional specifications.

44. A system for machining a workpiece as in claim 43, wherein the plurality of data includes step feed data, the step feed data including an incremental cutting depth and a number of cutting steps for cutting said plurality of valve seats.

45. A system for machining a workpiece as in claim 43, wherein the set-up parameters and the operating parameters for storage in said memory device are obtained by cutting an initial valve seat of said plurality of valve seats.

46. The improved system of claim 30, further comprising a system controller for generating a control signal for controlling a rotational speed and a translational speed of said spindle.

47. The improved system of claim 46, further comprising a memory device for storing and for providing to said system controller a plurality of data including at least one of a group of set-up parameters, operating parameters, and dimensional specifications.

48. The improved system of claim 47, wherein the plurality of data includes step feed data, the step feed data including an incremental cutting depth and a number of cutting steps for cutting said plurality of valve seats.

49. The improved system of claim 47, wherein the set-up parameters and the operating parameters for storage in said memory device are obtained by cutting an initial valve seat of said plurality of valve seats.

* * * * *